United States Patent [19]

Laval et al.

[11] 4,297,576

[45] Oct. 27, 1981

[54] DEVICE FOR THE INTERCONNECTION OF CONDUCTIVE TERMINALS LOCATED WITHIN A DEMOUNTABLE ENCLOSURE AND CONDUCTIVE TERMINALS LOCATED OUTSIDE SAID ENCLOSURE

[75] Inventors: Michel Laval, Saint Martin D'Uriage; Edmond Tournier, Grenoble, both of France

[73] Assignee: Commissariat a l'Energie Atomique, Paris, France

[21] Appl. No.: 97,051

[22] Filed: Nov. 23, 1979

[30] Foreign Application Priority Data

Nov. 28, 1978 [FR] France ............................... 78 33545

[51] Int. Cl.[3] ........................ G01T 1/18; G01N 21/00

[52] U.S. Cl. .................................... 250/336; 250/385; 250/445 T

[58] Field of Search ............ 250/336, 374, 385, 445 T

[56] References Cited

U.S. PATENT DOCUMENTS 4,119,853 10/1978 Shelley et al. ...................... 250/385
4,161,655 7/1979 Cotic et al. ......................... 250/385
4,217,498 8/1980 Racz et al. .......................... 250/385

FOREIGN PATENT DOCUMENTS 2438848 9/1980 France .

*Primary Examiner*—Alfred E. Smith
*Assistant Examiner*—Janice A. Howell
*Attorney, Agent, or Firm*—Millard & Cox

[57] ABSTRACT

Conductive terminals located within a casing constituted by two separable portions and conductive terminals located outside the casing are interconnected by means of conductors which pass through the casing between the two separable portions. In particular, the invention permits interconnection of detection cells and measuring channels within an X-ray tomographic apparatus while preventing leakage currents, the connecting conductors being insulated with respect to each other and with respect to the casing.

6 Claims, 4 Drawing Figures

DEVICE FOR THE INTERCONNECTION OF CONDUCTIVE TERMINALS LOCATED WITHIN A DEMOUNTABLE ENCLOSURE AND CONDUCTIVE TERMINALS LOCATED OUTSIDE SAID ENCLOSURE

This invention relates to a device for the interconnection of conductive terminals located within a demountable enclosure and conductive terminals located outside said enclosure.

The device under consideration is more particularly applicable to the connection of electrodes and measuring channels in a tomographic apparatus. Said device serves to eliminate the leakage currents which are liable to appear in the insulators employed between the interconnection and the other conductive portions of the apparatus.

It is known that an X-ray tomographic apparatus comprises detection cells delimited by measuring electrodes which are brought to a polarization potential and housed within a casing, one face of which receives the X-rays and the open end of which is closed by a cover. As a general rule, said casing is filled with gas under pressure such as xenon, for example. In order to obtain an image of anorgan observed by means of this apparatus, it is necessary to connect the detection cells to electronic channels for measuring the currents received by each electrode. In order to improve the spatial resolution of the apparatus, it is necessary to make provision for a very large number of detection cells. At the present time, this number can attain 500 and even 1000 detection cells, provision being naturally made for a similar number of electrodes. Thus in an apparatus having 500 to 1000 detection cells, 500 to 1000 connections are necessary in order to connect the tomographic apparatus to the different measuring channels. As a rule, these connections are established by means of a wire-to-wire system at the exit of the casing. In order to insulate the different leads of the wiring system with respect to the casing, said leads pass out of the casing through glass bead bushings which are welded or bonded to said casing. As a result of the large number of electrodes made necessary by the increase in spatial resolution, the mechanical arrangement of 500 or 1000 glass beads becomes difficult and even impossible. One example of construction of a tomographic apparatus having a very large number of cells is given in French patent application No. 78 29267 filed on Oct. 13, 1978 in the name of the present applicant. It is thus apparent from this patent application that any leakage current within the insulators of a tomographic apparatus must essentially be prevented. Apart from the problem presented by the large number of conductors which establish interconnections between the cells and the electronic measuring channels, a further problem arising from these interconnections lies in the leakage currents which appear at the points of penetration through the casing wall, especially when insulating beads are employed.

The aim of the invention is to overcome these disadvantages and especially to provide a device for interconnection by means of conductors between conductive terminals located within a demountable enclosure and conductive terminals located outside said enclosure. In particular, the invention permits interconnection of detection cells and measuring channels within an X-ray tomographic apparatus while preventing the appearance of leakage currents between the conductors which provide an interconnection between the cells and the measuring channels as well as the conductive portions, especially the casing in which the electrodes of the tomographic apparatus are housed. The device according to the invention also serves to establish an interconnection between the cells and the measuring channels when the tomographic apparatus has a very large number of cells. In an X-ray tomographic apparatus, the detection cells comprise measuring electrodes which are brought to a polarization potential and are housed within a casing, one face of which receives the X-rays and the open end of which is closed by a cover. The interconnection device according to the invention is provided with conductors which serve to connect the measuring electrodes to the measuring channels and with means for insulating said conductors with respect to the casing and if necessary with respect to each other. Said conductors pass through the casing at the interface between this latter and the cover.

The invention is directed to a device for providing an interconnection by means of conductors between conductive terminals located within a demountable enclosure and conductive terminals located outside said enclosure, the device being distinguished by the fact that the conductors pass through the enclosure wall between the two demountable portions of said enclosure.

According to another distinctive feature, the conductors are carried by a sheet which is electrically insulated from these latter.

According to a particular feature, the conductors are contained within said electrically insulated sheet.

According to a further distinctive feature in which variable potentials to be measured appear at said internal terminals, the conductors aforementioned are brought to a polarization potential, said sheet being covered on each face respectively by a conductive layer which is brought to said polarization potential.

According to yet another distinctive feature, said sheet is formed of insulating material.

According to still another distinctive feature in which variable potentials to be measured appear at said terminals, the conductors of a first group are brought to a first polarization potential and the conductors of a second group are brought to a second polarization potential, said groups of conductors being separate and insulated from each other. Said insulating sheet as well as each group of conductors is held between two conductive layers which are brought to the same polarization potential as that of the group of corresponding conductors.

Further distinctive features and advantages of the invention will become more readily apparent from the following description, reference being made to the accompanying drawings wherein.

Identical elements shown in the different figures are designated by the same reference numerals in each instance.

Figure 1:
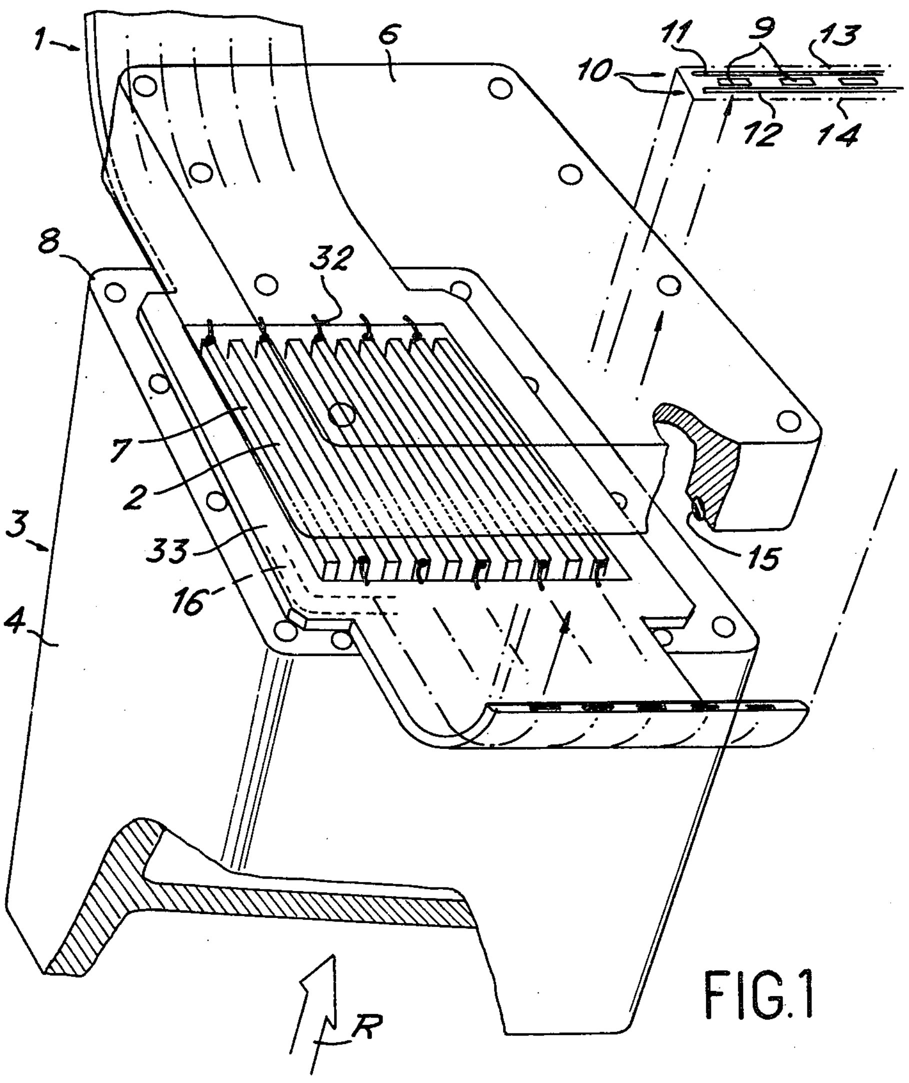
FIG. 1 illustrates the location of a device according to the invention. In the example of application shown, said device permits the interconnection of detection cells and measuring channels within an X-ray tomographic apparatus.

Referring first to FIG. 1, an interconnection device according to the invention is designated by the reference numeral 1. In the example of construction shown, this device permits the interconnection of detection cells 2 of an X-ray tomographic apparatus 3 with measuring channels which are not shown in this figure. These channels make it possible to visualize the image of an organ by means of signals received from the detection cells when these latter are subjected to an X-radiation which is shown at R and which has passed through the organ to be radiographed. The detection cells of the tomographic apparatus 3 are housed within a casing 4, one face of which (not shown) receives the X-rays and the open end 5 of which is closed by a cover 6. Said detection cells comprise measuring electrodes 7 which can be of the same type as those described in French patent application No. 78 29267 filed on Oct. 13, 1978 in the name of the present applicant. The interconnection device 1 is designed in the form of a band which passes through the casing at the interface 8 between the casing and its cover. This interconnection device comprises conductors 9 which will be described in greater detail hereinafter. Said conductors 9 are insulated from each other and are insulated from the casing, especially by means of an insulating sheet 10 in which they can be embedded. Said insulating sheet 10 is covered on each face respectively with conductive layers 11, 12 which are in turn covered with insulating layers 13, 14. As will be explained hereinafter in greater detail, said conductive layers are brought to the electrode polarization potential in order to prevent the appearance of leakage currents within the insulating material which surrounds said conductors. Said conductive layers have much the same action as a guard ring placed around a filiform conductor and brought to the same potential as said conductor. In a particular form of construction and in order to ensure perfect leak-tightness between the cover and the casing at the level of the interface between said cover and said casing, the interconnection device 1 can have the shape illustrated in the figure in order to cooperate with gaskets 15, 16 which are intended to ensure perfect leak-tightness between the cover and the casing. It is readily apparent that the lateral portions 33 of the interconnection device are provided at the level of the casing only with insulating layers and sheets as well as conductive layers if necessary. The conductors are connected to the electrodes 7 in the manner shown at 32.

Figure 2:
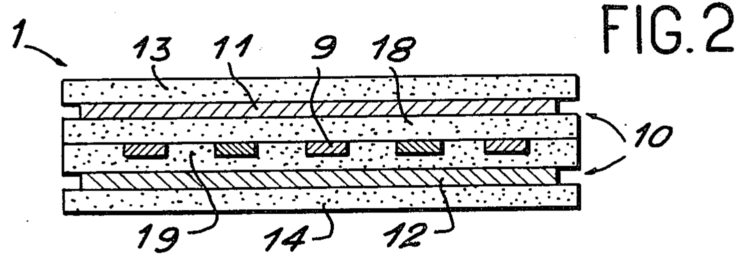
FIG. 2 is a transverse sectional view of the interconnection device according to the invention.

Referring now to FIG. 2, the interconnection device according to the invention is shown in transverse cross-section. As already mentioned in the description relating to FIG. 1, said device comprises conductors 9 which are insulated from each other and from the casing of the tomographic apparatus by means of a structure comprising an insulating sheet 10 which contains said conductors; said insulating sheet is covered on each face respectively with conductive layers 11, 12 which are in turn covered with insulating layers 13, 14. The conductors 9 are preferably parallel strips made of copper by etching a continuous layer, for example. The conductive layers 11, 12 can also be copper layers deposited on the faces of the sheet 10. Said sheet 10 can be constituted by two layers 18, 19; by way of example, the layer 18 initially carries the copper layer in which the conductive strips 9 are etched, said strips being intended to connect each electrode to each electronic channel. The conductive layers 11, 12 are brought to the same polarization potential as that of the electrodes to which the conductors 9 are connected. Said conductive layers 11, 12 perform the function of guard rings between the conductive strips and the conductive mass of the casing of the tomographic apparatus. The insulating layers can be formed of polytetrafluoroethylene (more commonly designated by the trade name "Teflon"), of polyamide ("Kapton") or of epoxy resin reinforced with glass fiber.

Figure 3:
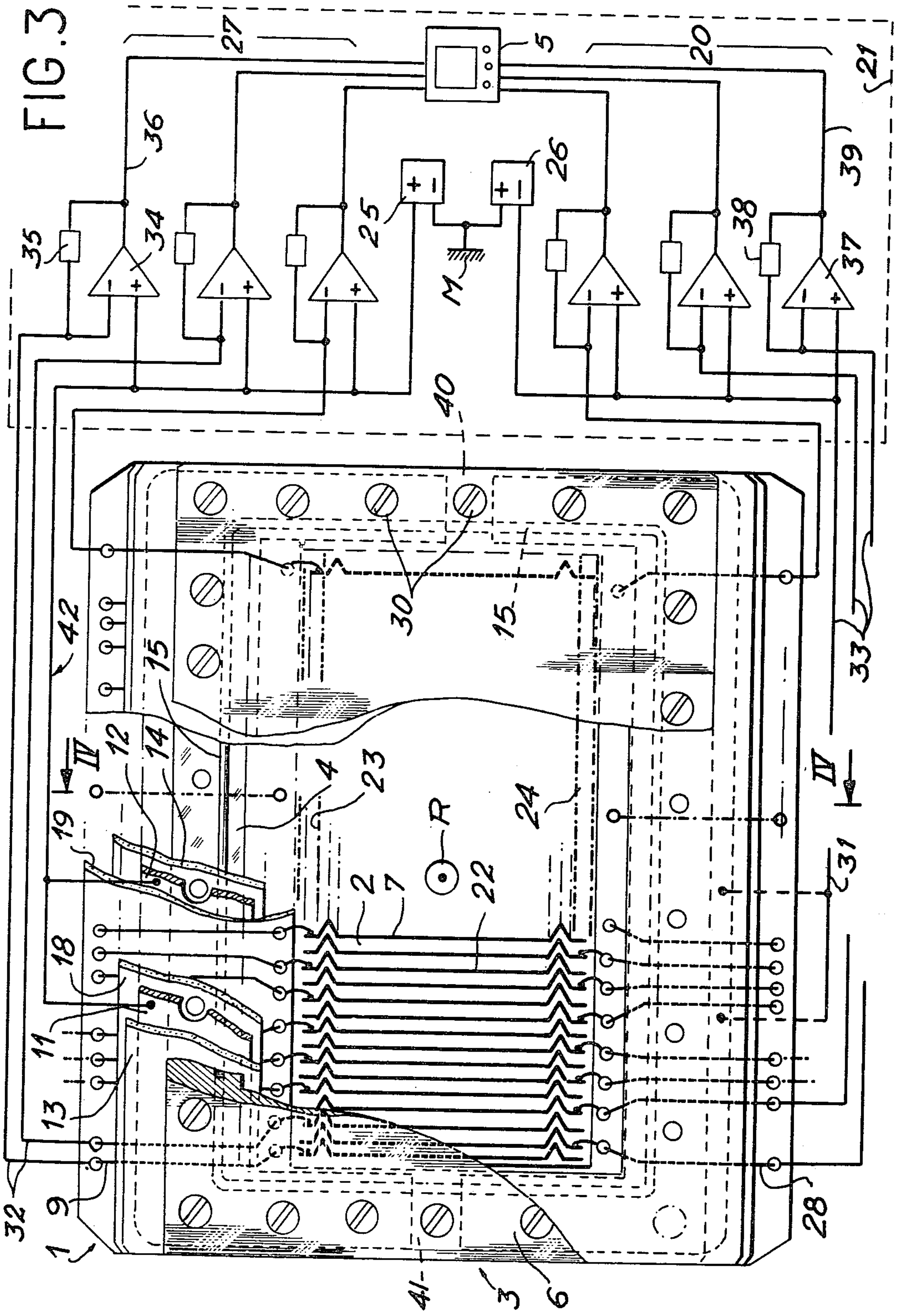
FIG. 3 is a diagrammatic view showing the general circuit arrangement of the device according to the invention and of the X-ray tomographic apparatus to which the device is applied.

FIG. 3 serves to gain a clearer understanding of the interconnection of the device according to the invention between the detection cells 2 of an X-ray tomographic apparatus 3 and the measuring channels 20 and 27 of an electronic assembly 21 which permits visual display of the organ to be X-rayed by means of the tomographic apparatus 3. Said apparatus can be of the same type as the unit described in the patent application cited earlier. It is assumed in this figure that the observer is looking on the rear face of the tomographic apparatus and that the radiation R is perpendicular to the plane of the figure. Said tomographic apparatus is of the multicell type and the detection cells comprise a plurality of anodes 7 and cathodes 22 placed alternately on insulating cross-bars shown diagrammatically at 23 and 24. The cross-bars and the electrodes are placed within the casing 4, said casing being closed by the cover 6 which is secured by means of screws 30. Leak-tightness is ensured by means of the gaskets 15, 16 mentioned earlier. The gasket 15 alone is visible in this figure. As mentioned in the patent application cited earlier, the insulating cross-bars can be covered with a conductive layer on the face located opposite to the ends of the electrodes which are supported on said cross-bars, a more complete description of which will be given hereinafter. By way of example, the electrodes 7 are brought to a positive polarization potential with respect to a reference potential M by means of a power supply unit 25 and constitute anodes. Similarly, the electrodes such as those designated by the reference 22 are brought to a negative polarization potential with respect to a reference potential M by means of a power supply unit 26 and constitute cathodes. The measuring channels 27 are connected to the anodes 7 by means of the conductors 9 of the interconnection device 1 according to the invention. As indicated earlier, the interconnection device comprises, in the case of the upper portion of the apparatus shown in the figure, conductors 9 which are embedded for example in the insulating layer 19 and covered with the insulating layer 18. There are also shown in the figure the conductive layers 11 and 12 which are in turn covered with the insulating layers 13, 14. The conductive layers 11, 12 are brought by means of the conductor 42 to the same predetermined positive potential as the potential of the anodes 7 by means of the supply unit 25. In addition, the supply unit 25 makes it possible on the one hand to apply said polarization potential to the anodes 7 by means of the measuring channels 27, the circuit 32 and the conductors 9 and, on the other hand, to apply said potential to the conductive layer which covers the electrode-supporting cross-bars 24 as will be explained hereinafter in greater detail. In consequence, the conductive layers 11 and 12 ofthe interconnection device which are continuous and brought to the same potential as the corresponding electrodes perform the function of a guard ring between the conductors 9 and the reference potential M to which the casing 4 of the tomographic apparatus 3 is brought. Similarly, the interconnection device 1 makes it possible to connect the cathodes 22 to the measuring channels 20 of the electronic assembly 21 by means of conductors 28 which are similar to the conductors 9 via the circuit 33. The negative potential of the power supply unit 26 is applied to the two conductive layers 11, 12 by means of the circuit 31. Said negative polarization potential is also applied by means of the measuring channels 20, the circuit 33 and the conductors 28 to each of the cathodes 22 as well as to the conductive layer which covers the cathode-supporting cross-bar 23 as will be explained below in detail. The conductive layers 11 and 12 follow the contour of the upper end of the casing 4 but are clearly interrupted in the central portion 40, 41 of said contour. In fact, said conductive layers are brought to a positive potential in the upper portion of the apparatus and to a negative potential in the lower portion, for example. On the other hand, the insulating layers 13, 14, 18 and 19 are continuous along the entire contour of the upper end of the casing 4.

The polarization potential of the anodes 7 is applied to said anodes by the circuit 32 which also serves to collect the measuring signals to be applied to the channels 27 of the electronic visual display assembly 21. In order to apply a positive high voltage to the anodes 7 and to collect the measuring signals on said anodes, the supply unit 25 is connected to the positive inputs of the operational amplifiers 34, the negative inputs of which are connected to the circuit 32. The negative input of each operational amplifier is connected to the output of said amplifier through a negative-feedback circuit 35 which can be a capacitor, for example. The outputs 36 of said operational amplifiers are connected to the visual display unit 5 of the electronic assembly 21.

Similarly, the cathodes 22 are connected to the supply unit 26 through operational amplifiers 37. The negative input of each amplifier is also connected to its output through a capacitor 38, for example. The outputs 39 of the amplifiers 37 are connected to the visual display unit 5.

It has been assumed in this figure that all the electrodes were measuring electrodes and that each electrode was therefore connected to one measuring channel of the electronic assembly 21. It is wholly apparent, however, that only the cathodes, for example, can be connected to the measuring channels whilst the anodes are simply brought to a positive polarization potential without being connected to a measuring channel. In this case the anodes are connected to each other and brought to the positive polarization potential whilst the cathodes are connected to the measuring channels. These measuring channels are referenced at a negative potential V with respect to a reference ground M having a potential of zero volt. The potential of the electrodes is V when no signal is present. It is readily apparent that, in the case in which the measuring channels are connected to the anodes and to the cathodes, the total resolution of the tomographic apparatus is double the resolution obtained in the case in which the cathodes alone are connected to the measuring channels. By means of the interconnection device according to the invention, it is therefore possible to employ a tomographic apparatus which can have two portions: one of these portions can be intended for the visual display of an organ with high spatial resolution; and in this case the anodes and the cathodes of this portion are connected to the measuring channels. The other portion can be intended for visual display of an organ which does not call for high spatial resolution, in which case the cathodes alone are connected to the measuring channels of the electronic visual display assembly.

Figure 4:
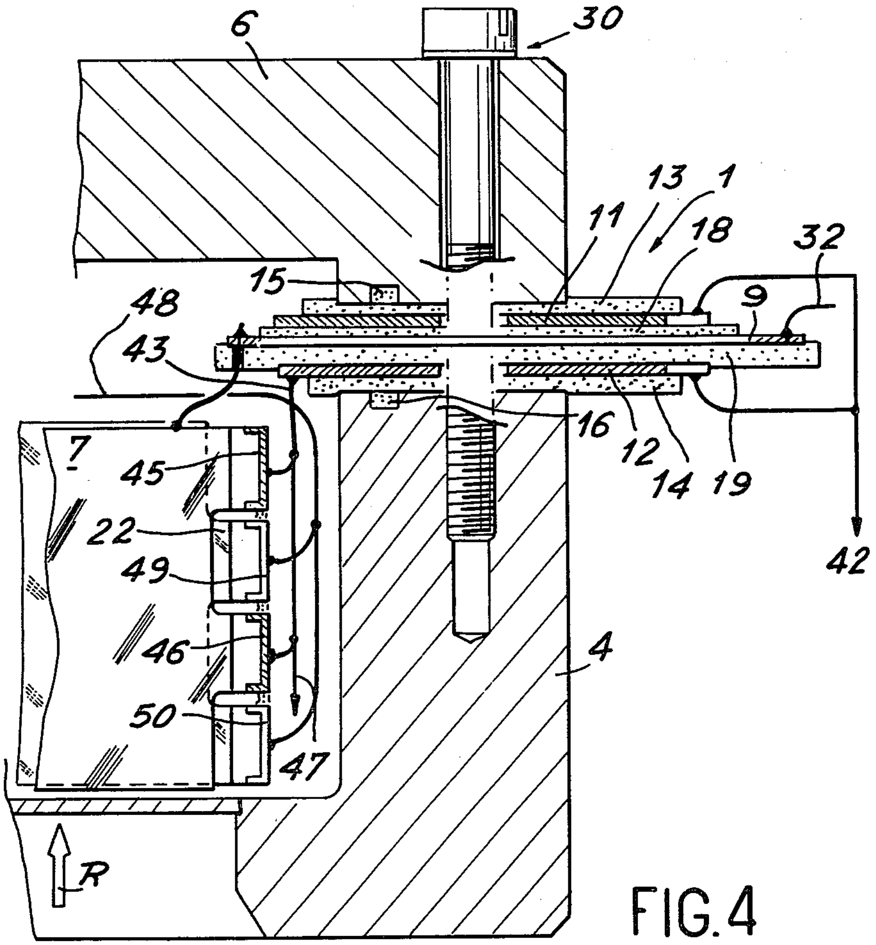
FIG. 4 is a diagrammatic sectional view of the tomographic apparatus of FIG. 3 taken on a plane IV—IV at right angles to the plane of FIG. 3 and showing the interconnection device according to the invention; only the upper portion of the tomographic apparatus has been illustrated in this sectional view.

Referring now to FIG. 4, the tomographic apparatus of FIG. 3 is illustrated in cross-section along a plane IV—IV at right angles to the plane of FIG. 3. Only the upper portion of the tomographic apparatus has been shown in this figure. The connection device according to the invention is designated in this figure by the reference numeral 1. The conductors 9 are connected to the anodes 7 but it is wholly apparent that identical conductors 28 are connected to the cathodes in the lower portion of the tomographic apparatus. Furthermore, these conductors are connected by means of leads 32 to the supply unit 25 through operational amplifiers described earlier.

The supply unit just mentioned has the intended function of bringing the anodes to a positive polarization voltage. The conductors 9 are embedded in insulating layers 18, 19 which are in turn covered with conductive layers 11, 12 connected at 42 to the supply unit 25. Said conductive layers are in turn covered with the insulating layers 13, 14. As mentioned in the foregoing and also in the patent application cited earlier, the conductive layer 12 is connected at 43 to the conductive layers 45, 46which cover the insulating cross-bars used as supports for the anodes 7 which form a guard ring at the base of said insulating cross-bars. An electrical connection 47 has the intended function of bringing to the positive high voltage the conductive layers which cover the insulating cross-bars used as supports for the anodes in the lower portion (not shown) of the tomographic apparatus. Similarly, the connection device located in the lower portion (not shown) of the tomographic apparatus serves to bring the cathodes 22 to a negative polarization voltage and to apply this voltage via the electrical connection 48 to the conductive layers 49, 50 which cover the base of the cross-bars employed for supporting the cathodes.

It has been assumed that the interconnection device described in the foregoing is applied to the interconnection of detection cells and measuring channels in an X-ray tomographic apparatus, all the electrodes of which are measuring electrodes. In consequence, the interconnection device has two symmetrical portions since it is provided with two groups of conductors brought respectively to positive and negative potentials. If only those electrodes which are polarized by a positive high voltage for example serve as measuring electrodes, the device according to the invention simply has one of the two symmetrical portions.

It is readily apparent that, in the device which has just been described, the means employed could have been replaced by equivalent means without thereby departing either from the scope or the spirit of the invention.

We claim:

1. A device for providing interconnection between conductive terminals, said terminals having variable potentials appearing thereat and being located within a conductive enclosure comprising two demountable portions, and conductive terminals located outside said enclosure, said device comprising conductive layers, a plurality of conductors mutually insulated from one another and lying between said conductive layers, and means for bringing said conductive layers and said conductors to a polarization potential, said conductive layers and said conductors passing through the wall of said enclosure between the two demountable portions thereof and being insulated from said enclosure.

2. A device for providing an interconnection by means of at least first and second groups of conductors between measuring electrodes located within an enclosure comprising two demountable portions and conductive terminals located outside said enclosure, wherein the conductors pass through the enclosure wall between the two demountable portions of said enclosure, said conductors being insulated from one another and from said enclosure and being supported by a sheet which is electrically insulated from said conductors, variable potentials to be measured appearing at each of said electrodes, said first group of conductors being brought to a first polarization potential and said second group of conductors being brought to a second polarization potential different from the first polarization potential, a first pair of conductive layers brought to said first polarization potential and having said first group of conductors sandwiched therebetween; and a second pair of conductive layers brought to said second polarization potential and having said second group of conductors sandwiched therebetween.

3. An device according to claim 2 wherein the conductive layers are covered with an insulation layer on the respective outer faces thereof.

4. A device according to claim 3 wherein the sheet covers the periphery of the interface between the two demountable portions of the enclosure.

5. A device according to claim 4, wherein two gaskets are placed opposite each face of said sheet.

6. A device for interconnecting first and second sets of measuring electrodes, said sets comprising equal numbers of electrodes, located with a gas ionization chamber of a multicell detector for X-ray axial tomography, with conductive terminals located outside said ionization chamber, said ionization chamber comprising an enclosure and a cover for closing said enclosure in a gastight manner, said first set of electrodes being brought to a first polarization potential and said second set of electrodes being brought to a second polarization potential different from said first polarization potential, each electrode carrying electrical signals resulting from the ionization of the gas within the detector by X-rays, said device comprising a first group of conductors connected to said first set of electrodes, a second set of conductors connected to said second set of electrodes, a first pair of conductive layers brought to said first polarization potential and having said first group of conductors sandwiched therebetween, and a second pair of conductive layers brought to said second polarization potential and having said second group of conductors sandwiched therebetween.

* * * * *